Aug. 2, 1955

C. S. R. WOTTON 2,714,651

ELECTRICALLY HEATED SOLDERING IRONS

Filed May 21, 1952

INVENTOR
Charles Sydney Richard Wotton
By:
Haseltine, Lake & Co.
AGENTS

United States Patent Office 2,714,651
Patented Aug. 2, 1955

2,714,651

ELECTRICALLY HEATED SOLDERING IRONS

Charles Sydney Richard Wotton, Brentford, England

Application May 21, 1952, Serial No. 289,030

Claims priority, application Great Britain May 25, 1951

3 Claims. (Cl. 219—26)

This invention relates to electrically heated soldering irons and more particularly to miniature soldering irons for use in the instrument manufacturing industries where the delicacy of soldering work is important.

Soldering irons of known construction usually employ a heating winding of the wound-mica type. Difficulties have hitherto been encountered in producing a heating winding of such proportions so as to allow the construction of a miniature soldering iron particularly adapted to delicate soldering work in the instrument, radio and deaf-aid industries.

The object of the present invention is to provide an electrically heated miniature soldering iron of such proportions as to be particularly suitable for delicate soldering work.

Another object of the invention is to provide an electrically heated miniature soldering iron of particularly simple construction.

Yet another object of the invention is to provide an electrically heated miniature soldering iron of such construction as to be free from the liability of damage due to mechanical shocks.

The objects of the invention are achieved by using a heating element, consisting of a winding which is internally unsupported and which is directly introduced into the shank of the soldering iron, such winding being insulated with an enclosing electrically insulating and heat resisting sleeve.

For a better understanding of the invention and to show how the same may be carried into effect reference will now be made to the accompanying drawings in which.

Figure 1:
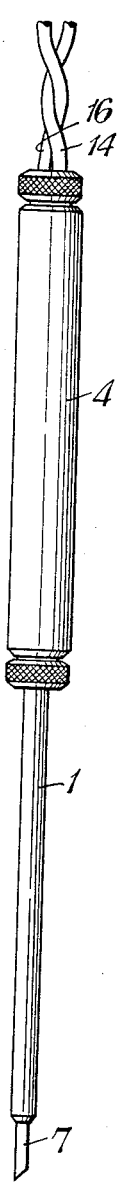
Fig. 1 is an elevational view of a soldering iron.
Figure 2:
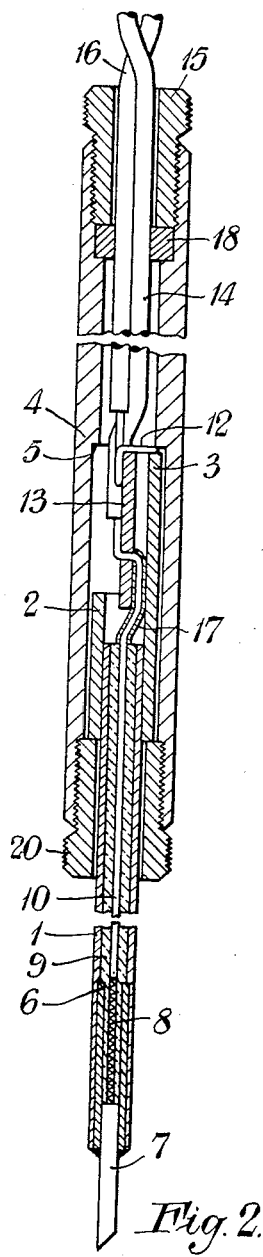
Fig. 2 is a longitudinal cross-section of the soldering iron.

Referring now to Figs. 1 and 2 of the drawings, the miniature soldering iron consists of a metal tube 1, one end of which fits into a shorter metal tube 2, the remote extremity of which has been cut to leave a semi circular wall 3. The tube 2 is enclosed within another tube 4 of larger diameter and made of electrically insulating material. The insulated tube 4 acts as the handle of the soldering iron. The tube 2 is held in position within the insulating tube 4 by means of the screw-threaded bush 20 which holds the tube 2 in abutting relation with a shoulder 5 in the handle. The end of the tube 1 remote from the insulated handle, contains a sleeve 6, made of metal of good thermal conductivity, the external diameter of which is equal to the internal diameter of the tube 1. The end of the sleeve 6 is closed by means of a bar of metal which acts as a working bit 7 for the soldering iron, such bar also being made of metal of good thermal conductivity, for example, copper. The bit 7 is held in position by hard soldering. Within the sleeve 6 there is contained a heating winding consisting of a closely wound helical coil 8 of resistance wire, one end of which is joined to the metal tube 1 and to the bit, whilst the other end of the coil is joined to a wire conductor 10 running along the hollow of the inter-fitting metal tubes. The helical coil 8 and the wire conductor 10 are covered by means of a fibre-glass sleeve 9, which acts as an electrical insulator to prevent short circuiting when an electromotive force is applied across the conductor wire 10 and the metal tubes.

A convenient working voltage lies in the region of 6–24 volts according to the characteristics of the heating winding used. All the metal tubes are held in position by hard solder at the locations where one tube emerges from another tube of larger diameter. Tube 2, which has its wall cut away over part of its length, is also provided, at the semi-circular wall end, with a wire tag 12. At the other end of the semi-circular wall there is a slot which extends a short distance away from the semi-circular wall, as shown in Fig. 2. The slot and the wire tag 12 serve to hold a tag panel 13 in position across the semi-circular wall. The tag panel has an aperture through which one end of the wire conductor 10 is passed. The tag panel 13 acts as an anchor for the conductor 10 which at its other end is joined to the heating coil 8. A flexible and insulated lead 14 extends along the inside of the insulated handle 4 and is joined on the tag panel 13 to the wire conductor 10. The flexible lead 14 emerges from the handle through a threaded bush 15 disposed at the end of the insulated handle. A second insulated lead 16 is connected to the wire tag 12 and hence to the metal tubes, such lead 16 extending within the insulated handle and emerging through the threaded bush 15. Thus two leads are provided for connecting the heating element to a source of electrical power. The wire conductor is insulated by sleeve 17 where the conductor passes through the tube 2. The leads 14 and 16 have a binding tape 18, such binding lying within the handle at a location where the leads enter the threaded bush 15, so that any mechanical tensile force on the leads outside the handle is taken by the threaded bush 15 and not by the internal connections.

When the leads 14 and 16 are connected to a source of electro-motive force, current will flow through one lead, through the wire conductor to the heating coil and back to the other lead via the metal of the tubes, thus completing a heating current circuit.

The bit may be formed as a hollow cap 19 (Fig. 3) for fitting over the end of the tube 1. In order to reduce the possibility that the cap-like bit 19 might become jammed on the tube 1, the former is provided with a split skirt and tube 1 can be made of a rustless material, for example, rustless or stainless steel, and the hollow bit can be made of material which is not prone to oxidisation at a temperature at which it is likely to be used, i. e., approximately 300° C. The material used for the hollow bit 19 should have good thermal conductivity, for example, the material may be pure nickel.

The constructional form of soldering iron described above has a capacity sufficient for almost all soldering work encountered in the radio, deaf-aid and instrument industries. Occasionally, a heavy joint is encountered, when a greater heating capacity is required. To allow such a joint to be soldered, two or more inter-twined helical heating coils may be provided in the iron, one of which is permanently connected to the flexible twin lead 14, 16, so providing sufficient heating for normal work. When additional heat is required the auxiliary coil (or coils) may be switched into circuit by means of a quick make-and-break switch either of the push-button or toggle type, mounted in the insulated handle.

Figures 3, 5:
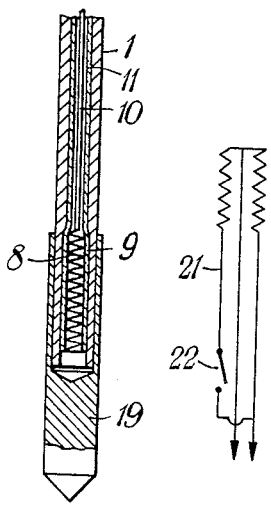
Fig. 3 is a sectional view of part of an alternative form of soldering iron.
Fig. 5 is a circuit diagram of a soldering iron having two heating elements.
Figure 4:
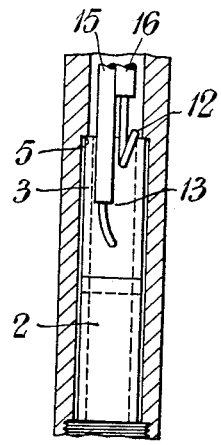
Fig. 4 is a sectional plan of a detail.

The circuit diagram for an iron with two heating coils is shown in Fig. 5. When additional heat is required, the switch 22 is closed and the second heating coil is fed with current via a second conductor 21 passing along the interior of the inter-fitting metal tubes. The conductor 21 is insulated by a sleeve and the ends of the coils are joined to the metal of the tubes as before.

I claim:

1. A soldering iron comprising a hollow handle, a metallic tube partly located in said handle and extending therefrom to form the soldering iron shank, a fibre glass sleeve located within said shank, an internally unsupported heating winding loosely located within said sleeve near the free end of said shank, an insulated electrical conductor located within and extending along the shank, an electrical connection between said conductor and one extremity of said winding, an electrical connection between the other extremity of said winding and said shank whereby a heating current may be passed through said winding upon completion of a circuit between said conductor and said shank and a soldering bit formed with a peripheral shirt forming a socket for engagement of said bit over the free end of the shank, said bit being merely a push-on fit on said shank and retained in position without the aid of additional securing means to be heated by said heating winding.

2. A soldering iron comprising a hollow handle, a first metallic tube located with said handle, a threaded bush applied to one end of said handle to retain said tube in position therein, a second metallic tube supported in said first tube and adapted to project through said bush and from said handle to form the soldering iron shank, a fibre glass sleeve located within said shank, an internally unsupported heating winding loosely located within the sleeve near the free end of said shank, an insulated electrical conductor located within and extending along the shank, an electrical connection between said conductor and one extremity of said winding, an electrical connection between the other extremity of said winding and said shank, a tag panel supported on said first metallic tube, a tag on said tag panel connected to said conductor whereby a heating current may be passed through said winding on completion of a circuit between said tag and said shank and a soldering bit formed with a peripheral shirt for engagement of said bit over the free end of the shank whereby said bit is heated by said heating winding, said bit being merely a push-on fit on said shank and retained in position thereon without the aid of additional securing means.

3. A soldering iron comprising a hollow handle, an internal shoulder formed in the handle, a first metallic tube located within said handle, a screw threaded bush applied to one end of said handle to hold said tube in abutting relation to said shoulder, a second metallic tube supported in said first tube to project through said bush and from said handle to form the soldering iron shank, a fibre glass sleeve located within said shank, an internally unsupported heating winding loosely located within the sleeve near the free end of said shank, an insulated electrical conductor located within and extending along the shank, an electrical connection between said conductor and one extremity of said winding, an electrical connection between the other extremity of said winding and said shank, a tag panel supported on said first metallic tube, a tag on said tag panel connected to said conductor, two electrical leads extending into and along the handle, one of said leads being connected to the tag on the tag panel and the other to the shank, a second screw threaded bush surrounding the twin leads and applied to that end of said handle remote from said first bush, and a soldering bit formed with a peripheral shirt for engagement of said bit over the free end of the shank whereby said bit is heated by said heating winding, said bit being merely a push-on fit on said shank and retained in position without the aid of additional securing means.

References Cited in the file of this patent

UNITED STATES PATENTS

| | | |
|---|---|---|
| 1,478,319 | Young | Dec. 18, 1923 |
| 2,213,438 | Young | Sept. 3, 1940 |
| 2,257,376 | Grey | Sept. 30, 1941 |
| 2,354,809 | Goldstine | Aug. 1, 1944 |
| 2,475,376 | Darling | July 5, 1949 |
| 2,552,193 | Lennox | May 8, 1951 |
| 2,582,481 | Dvorak et al. | Jan. 15, 1952 |
| 2,592,426 | Jeffrey | Apr. 8, 1952 |
| 2,619,576 | Greibach | Nov. 25, 1952 |

FOREIGN PATENTS

| | | |
|---|---|---|
| 546,947 | Great Britain | Aug. 6, 1942 |